United States Patent [19]
Smith et al.

[11] Patent Number: 5,359,266
[45] Date of Patent: Oct. 25, 1994

[54] SYSTEM FOR GENERATING TRIGGERING PULSES FOR USE IN BEAM INDEXING TYPE COLOR CATHODE RAY TUBES

[75] Inventors: Ceil E. Smith, Los Angeles, Calif.; Philip L. Writer, Marietta, Ga.

[73] Assignees: Howard Nusbaum, Stamford, Conn.; a part interest; Cosmo F. Zaccardo, Jr., Bayville, N.J.; a part interest to each

[21] Appl. No.: 978,934

[22] Filed: Nov. 20, 1992

[51] Int. Cl.$^5$ .................... H01J 29/52; H01J 31/26
[52] U.S. Cl. ...................... 315/383; 315/10; 348/811
[58] Field of Search ............ 315/10, 383; 358/69, 358/67, 66

[56] References Cited
U.S. PATENT DOCUMENTS

| | | | |
|---|---|---|---|
| 3,939,486 | 2/1976 | Tomii | 358/46 |
| 4,163,250 | 7/1979 | Tomii et al. | 358/45 |
| 4,306,248 | 12/1981 | Goodman | 358/56 |

*Primary Examiner*—Theodore M. Blum
*Attorney, Agent, or Firm*—Irving Keschner

[57] ABSTRACT

A single gun color cathode ray tube (CRT) having a screen consisting of alternating red, blue and green vertical phosphor strips in groups of three, with strips of conductive or photovoltaic material overlaying each phosphor strip, or placed between adjacent strips. The same color conductive strips are connected in parallel in three arrays, and connected to three individual trigger buses. The conductive lines are connected to a positive bias voltage such that when the electron beam within the CRT strikes a conductive strip, a pulse is generated and fed to the corresponding trigger bus. As the single electron beam scans the screen, trigger pulses are generated in the conductive strips and are fed to a trigger pulse amplifier and then to a multiplexer and used as control signals. The multiplexer in turn gates the color video signals from a remote source, such as a workstation or television set, such that the corresponding video signal for that color is modulating the beam as the electron beam strikes a phosphor strip corresponding to that color.

18 Claims, 5 Drawing Sheets

SYSTEM FOR GENERATING TRIGGERING PULSES FOR USE IN BEAM INDEXING TYPE COLOR CATHODE RAY TUBES

BACKGROUND OF THE INVENTION

1. Field of the Invention

The present invention relates to an improved system for generating indexing signals for a beam indexing type of color cathode ray tube.

2. Description of the Prior Art

In view of the growing development of high definition television (HDTV), there is a need to develop a color CRT that can generate high resolution and high brilliance images for direct viewing and for single tube projection HDTV systems.

The current method used to generate color images in a color CRT for consumer TV employs three electron guns, a shadow mask, and a screen consisting of arrays of red, blue, and green phosphor dots arranged such that each electron gun will direct electrons to dots of a specific color. In this way, separate primary color images are generated which, when combined, produce the color picture. The obvious disadvantage of this scheme is in the use of three electron guns and in the shadow mask which typically absorbs eighty percent of the electrons from the guns, severely limiting the maximum possible brilliance of the image. Attempting to increase the brilliance of the image by raising the intensity of the electron beams results in the generation of x-rays and in localized heating of the shadow mask metal causing expansion and a loss of accurate targeting of electrons on the phosphor dots. Basically, the shadow mask type of CRT cannot be refined to meet the resolution and brilliance requirements of HDTV.

U.S. Pat. No. 3,081,414 to Goodman discloses a color cathode ray tube that eliminates the three gun/shadow mask principle and which can be used for direct viewing or in a single tube projection system. However, the Goodman system is not suitable for HDTV because the CRT's using the Goodman principle cannot be made in larger sizes, i.e. larger than an eight by eight inch screen size, and individual primary color intensities of the image cannot be adjusted by external electronic controls to produce an accurately balanced color picture or a true black and white picture.

A major problem in previous beam indexing systems, such as that disclosed in Goodman, is that the modulation of the electron beam by the video signals caused phase errors in the indexing signals and color fringing of the picture displayed on the screen, in effect reducing the resolution and brilliance of the picture displayed by the CRT. In addition, in those Goodman type systems which use ultraviolet or x-ray emissive strips on the screen or on the back of a metalized layer, the radiation pulses must be detected by an electron-multiplier or other photosensitive device capable of detecting radiation on all parts of the screen equally, without regard to the size of the screen. On larger tube sizes, this is virtually impossible to accomplish.

What is desired, therefore, is to provide a system using the Goodman principles but wherein the CRT can be made in larger sizes, the primary color intensities can be accurately adjusted and the picture displayed on the CRT has increased resolution and brilliance.

SUMMARY OF THE INVENTION

The present invention provides an apparatus for generating indexing signals for synchronizing the video information emitted by a single gun color cathode ray tube (CRT), the CRT having a screen consisting of alternating red, blue and green in vertical phosphor strips in groups of three, with strips of conductive or photovoltaic material overlaying each phosphor strip, or placed between adjacent strips. The same color strips are connected in parallel in three arrays, and connected to three individual trigger buses. The conductive lines are connected to a positive bias voltage such that when the electron beam within the CRT strikes a conductive strip, a pulse is generated and fed to the corresponding trigger bus. As the single electron beam scans the screen in a conventional manner, trigger pulses are generated in the conductive strips and are fed to a trigger pulse amplifier and then to a multiplexer and used as control signals. The multiplexer in turn gates the color video signals from the workstation or television set such that the corresponding video signal for that color is modulating the beam as the electron beam strikes a phosphor strip.

The present invention thus provides an improved single gun, color CRT indexing system, the CRT screen size being expandable from that available in the prior art, a picture of increased resolution and brilliance due to the enhanced synchronism between the trigger pulses and the modulating chroma video signals and a system whereby the individual primary color intensities of the screen image is adjustable to produce an accurately balanced color picture or a true black and white picture.

DESCRIPTION OF THE DRAWING

For a better understanding of the invention as well as other objects and features thereof, reference is made to the following description which is to be read, in conjunction with the accompanying drawing wherein.

DESCRIPTION OF THE INVENTION

Figure 1:
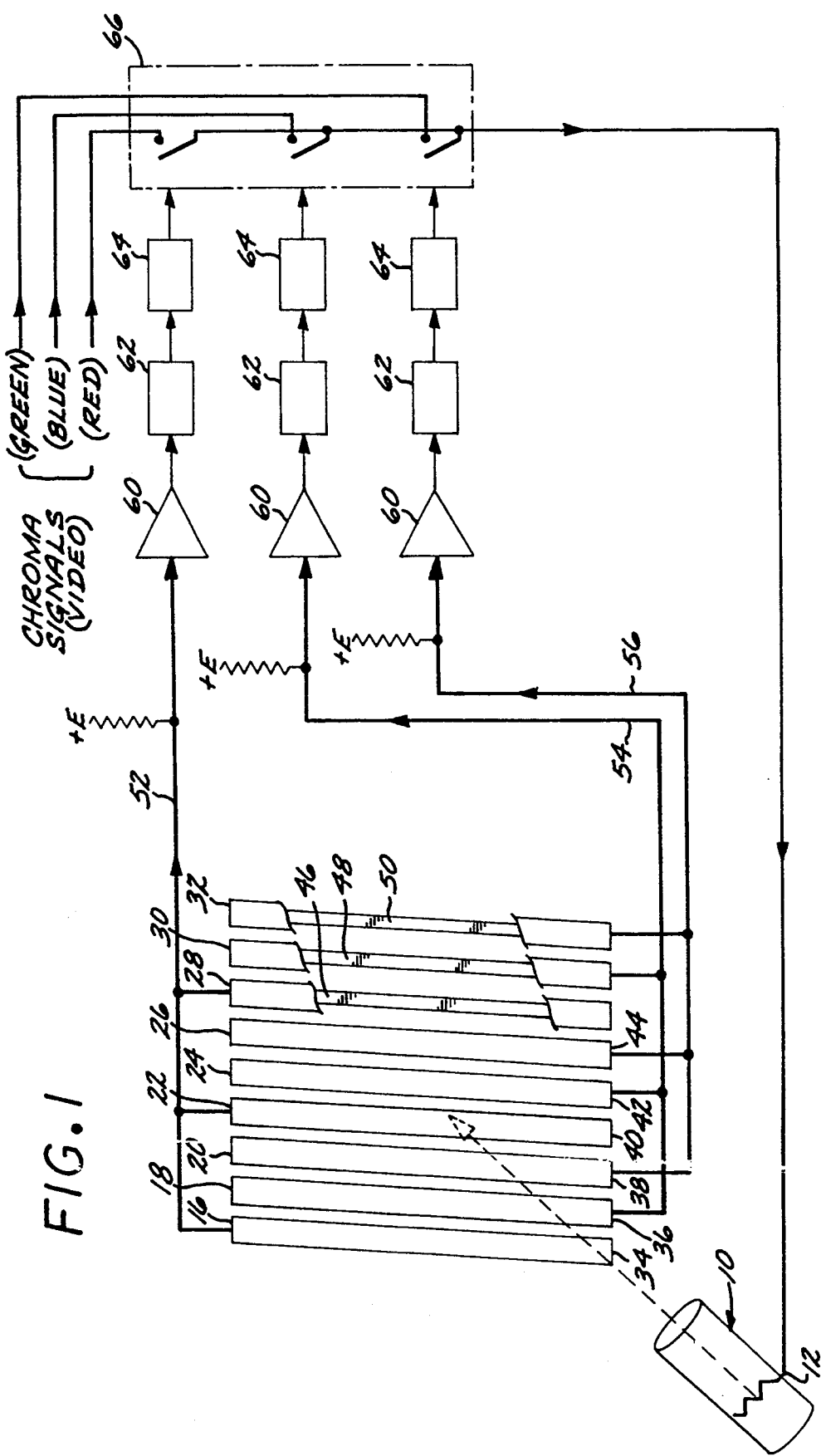
FIG. 1 is a partial block diagram showing both the optical and electrical components comprising the system of the present invention.

FIG. 1 is a simplified block diagram of the novel triggering pulse system of the present invention. A color cathode ray tube (CRT) 10 comprises a single electron gun (not shown), CRT grid or cathode 12 and a screen 14 (shown in FIGS. 5 and 6), the screen 14 comprising a series of vertical conductive strips 16, 18. . . 32 overlying corresponding phosphor strips 34, 36. . . 50 (conductive strips 28, 30 and 32 are shown partially broken away to illustrate underlying phosphor strip 46, 48 and 50 respectively). Phosphor strips 34, 40 and 46 emit red light when scanned by the electron beam generated by the CRT gun, strips 36, 42 and 48 comprising a phosphor material which emits blue light when scanned by the electron beam generated by the CRT gun and strips 38, 44 and 50 comprising a phosphor material which emits green light when scanned by the electron beam generated by the CRT gun 10. It should be realized that only a small portion of the screen is illustrated, there being approximately 1,500 lines and 8,000 strips, including black matrix strips in a typical screen. The scanning is accomplished in the conventional manner i.e., the electron beam scans a horizontal line across the face of screen 14 and is then positioned to scan another line and so on until the entire screen faced is scanned. The phosphors comprising strips 34, 36 . . . 50 are conventional and will not be described herein since it does not form part of the present invention. The conductive strips 16, 18 . . . 32 preferably comprise aluminum, although other metals transparent to an electron beam can be utilized, and are placed on the surface of the adjacent phosphors by conventional vacuum deposition techniques. It should be noted that photovoltaic material, the photovoltaic material generating an electrical signal in response to an incident electron beam, could be utilized in lieu of the metalized strips. The conductive strips are connected in parallel forming three arrays, the first array comprising strips 16, 22 and 28 having each strip of the array connected to bus 52, the second array comprising strips 18, 24 and 30, having each strip of the array connected to bus 54 and the third array comprising strips 20, 26 and 32 having each strip of the array connected to bus 56.

Figure 2:
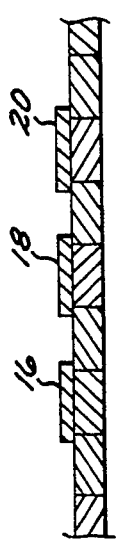
FIG. 2 is an end view of the conductive and phosphor strips forming the color/indexing signal generating portion of the system shown in FIG. 1.

Buses 52, 54 and 56 couple the sequence of pulses generated by each conductive strip when scanned by the electron beam to trigger amplifiers 60. Each bus is connected to a source of positive bias voltage E, typically 300 volts, to enhance the generation of the pulse signals in the case of a weak screen. Trigger amplifiers 60 limit the amplitude of the generated pulses on the corresponding buses, pulse width modulators 62 control the pulse width and pulse delay circuits 64 adjust the pulse delay, to form the indexing control pulses for electron multiplexer 66. The multiplexer 66 in turn gates the chroma (video) signals such that as the electron beam contacts a phosphor strip, the corresponding video signal is coupled to CRT grid 12 to modulate the beam in a synchronized manner. FIG. 2 is an end view of CRT screen 14 illustrating the conductive strips overlying a portion of the adjacent phosphor strip. Control of the width of the trigger pulse by external adjustments enables the intensity of the colors to be controlled. In particular, if the width of the trigger pulse for the blue chroma (color) signal, for example, is controlled such that the modulated chroma signal is on for the entire width of the blue phosphor strip, the intensity of the resultant blue color will be approximately twice as great than that if the beam was on for a time period corresponding to one-half of the width of the blue phosphor strip.

The present invention thus limits the indexing pulses to a constant amplitude, and establishes a minimum level of intensity for the beam. The independent channels for controlling the three video signals allows the relative intensities of the colors to be varied to produce the proper mix for a true 'white' screen. This adjustment would typically be accomplished following the time the CRT is installed.

Figure 3:
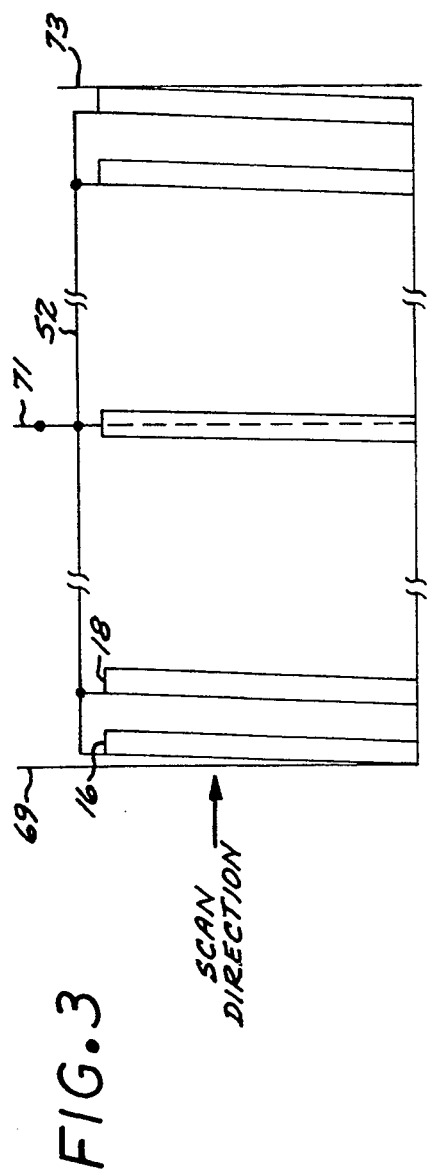
FIGS. 3 illustrates a technique to compensate for trigger pulse delays.

FIG. 3 schematically illustrates a technique for compensating for the varying trigger delays caused by the signal transit times between the conductive strips variously placed in the screen and the trigger take-off point. A typical workstation CRT screen has 1500 horizontal lines forming the height of the screen; in order to prevent the picture formed on the screen from being slanted, each conductive strip is slanted in the direction of the beam scan. The slant, if not otherwise compensated for, is caused by the inherent propagation transit times of the electrons stimulated by the incident electron beam. Specifically, the electrons stimulated at the top conductive strip, assuming a vertical orientation, for the first horizontal pixel, would arrive at the trigger take off point prior to the arrival of the electron stimulation from the same first horizontal pixel at the bottom of the conductive strip. The slanting of the conductive strips (the slant angle being dependent on slant size) as shown in the screen depiction illustrated in FIG. 3, provides the appropriate compensation by advancing the arrival of the trigger pulses, the advancement (provided by the slant angle) increasing as the electron beam scans vertically downward. The left edge of the screen is represented by reference numeral 69, the trigger take off point (approximate mid-point of the screen and point where bus is connected to follow-on circuitry) by reference numeral 71 and the right edge of the screen by reference numeral 73 (bus 52 is one of the three buses used).

Although the slant feature has been described with reference to the conductive strip/phosphor arrangement shown in FIGS. 1 and 2, it can also be used with the conductive strip/phosphor arrangement described hereafter with reference to FIGS. 4–6.

Figure 4:
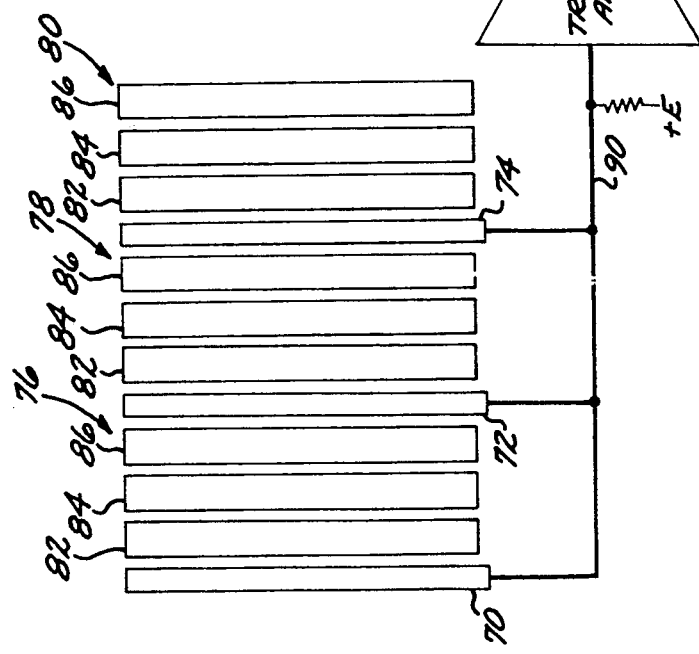
FIG. 4 is a simplified block diagram of a serial system for generating three indexing pulses from a single conductive or photovoltaic strip for a group of three colors.

FIG. 4 is another embodiment of the present invention wherein three indexing trigger pulses are generated from one conductive (or photovoltaic) strip for each group or array of three colors. Specifically, conductive strips 70, 72 and 74 separate arrays 76, 78 and 80, respectively, each array comprising strips of red (82), blue (84) and green (86) phosphor strips. In the simplified serial arrangement illustrated, as the electron beam from the CRT gun strikes conductive strip 70, a pulse is generated on bus 90, the pulse being amplified and shaped by trigger amplifier 92. The output from amplifier 92, corresponding to the emission from red phosphor strip 82, is coupled via lead 94 to multiplexer 66. Thereafter, and in a sequence delayed by the delays inherent in an electronic circuit, pulse generator 96 is energized by amplifier 92 and generates a signal on lead 98 which is coupled to multiplexer 66. Finally, the delayed output from pulse generator 96 energizes pulse generator 100 which generates a signal on lead 102 which is coupled to multiplexer 66. This identical sequence is repeated for each horizontal line in screen 14 as the electron beam strikes conductive strip 72 and the phosphors in array 78, and then conductive strip 74 and the phosphors in array 80.

Figure 5:
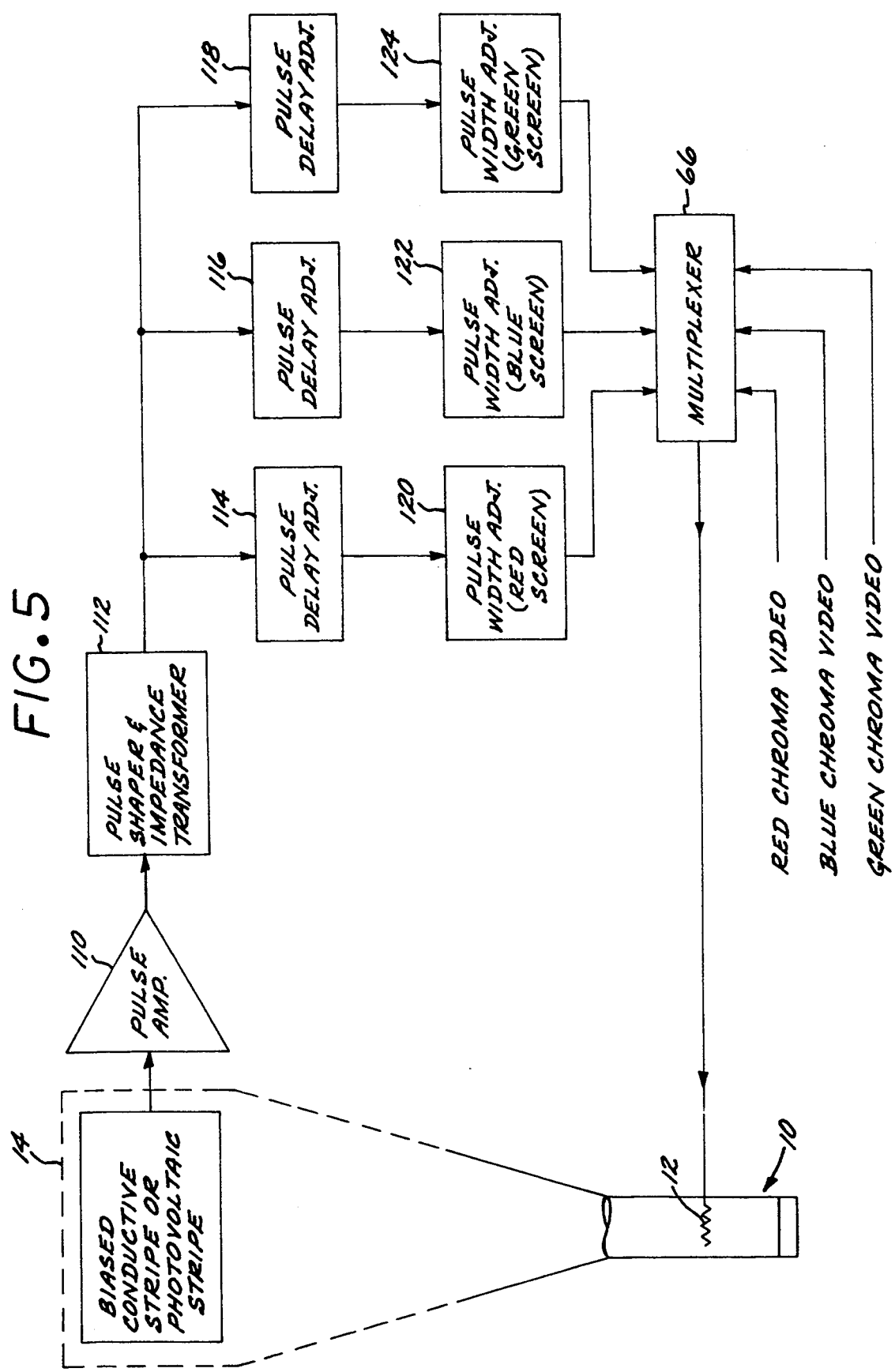
FIG. 5 is a simplified block diagram of a parallel system for generating three indexing trigger pulses from a single conductive or photovoltaic strip for a group of three colors.

FIG. 5 is a more detailed block diagram of a serial circuit arrangement for generating three indexing trigger pulses from a single conductive or photovoltaic strip per color phosphor using the conductive strip/phosphor arrangement shown in FIG. 4. The output from the first biased conductive or photovoltaic strip is coupled to pulse amplifier 110, the output of which is coupled to pulse shaper and impedence transformer 112. The output of transformer 112 is applied, in parallel, to pulse delay adjustment devices 114,116 and 118, the output of which are applied to pulse width adjustment devices 120, 122 and 124, respectively. The output of devices 120,122 and 124, corresponding to red, blue and green triggers, respectively, are coupled to multiplexer 66, which then is applied to CRT grid 12 to synchronize the modulating red chroma, blue chroma and green chroma video signals with the position of the corresponding color phosphor strips on CRT screen 14. In this embodiment, the proper sequence is realized by adjusting delays 114, 116 and 118 such that the single pulse activates the multiplexer 66 in the correct sequence, the pulse width adjustment devices 120, 122 and 124 adjusting the chroma intensity by varying the "on" time of the chroma video signal.

Figure 6:
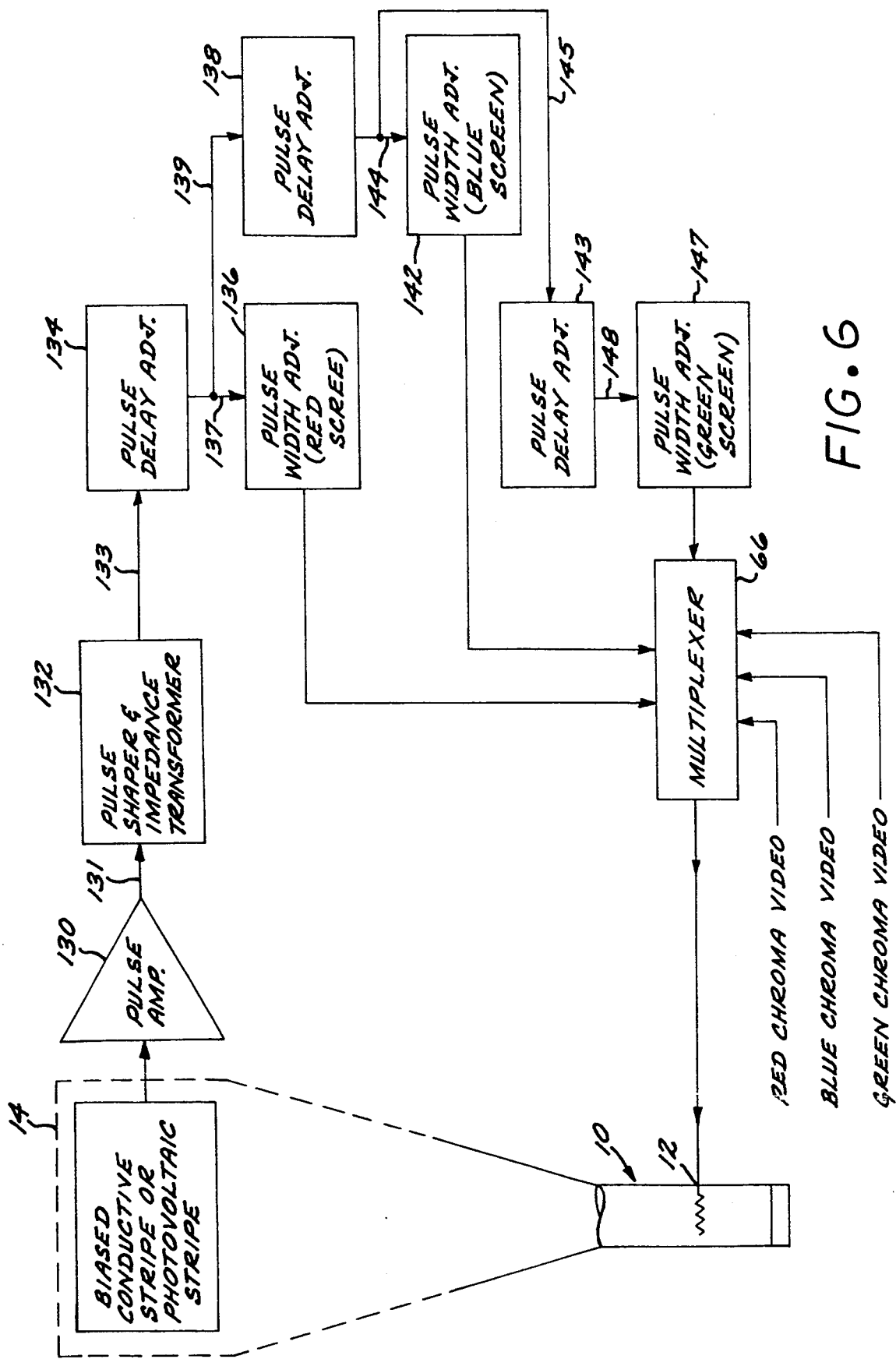
FIG. 6 is a simplified block diagram of a hybrid parallel serial system for generating three indexing trigger pulses from a single conductive or photovoltaic strip for a group of three colors.

FIG. 6 is another embodiment for generating three indexing trigger pulses from a single conductive or photovoltaic strip for a single array. In particular, the output from screen 14 is applied to pulse amplifier 130, the output of which is coupled to pulse shaper and impedence transformer 132 via lead 131. The output of pulse shaper 132 is connected to pulse delay adjuster 134 via lead 133, the output of which is connected to pulse width adjuster 136 via lead 137 and pulse delay adjuster 138 via lead 139. The output of pulse width adjuster 136, corresponding to the red chroma trigger, is connected to multiplexer 66 via lead 146. The output of pulse delay adjuster 138 is connected to pulse width adjuster 142 and pulse delay adjuster 143 via leads 143 and 145, respectively, the output of pulse width adjuster 142, corresponding to the blue chroma trigger, being connected to multiplexer 66 via lead 149. The output of pulse delay adjuster 143 is connected to pulse width adjuster 147 via lead 148, the output thereof being connected to multiplexer 66 via lead 151. As noted with respect to FIG. 5, pulse width adjustment devices 136,142 and 147 provides a simplified technique for accurately controlling the intensity of the chroma video signals and thus providing a true white color picture.

Figure 7:
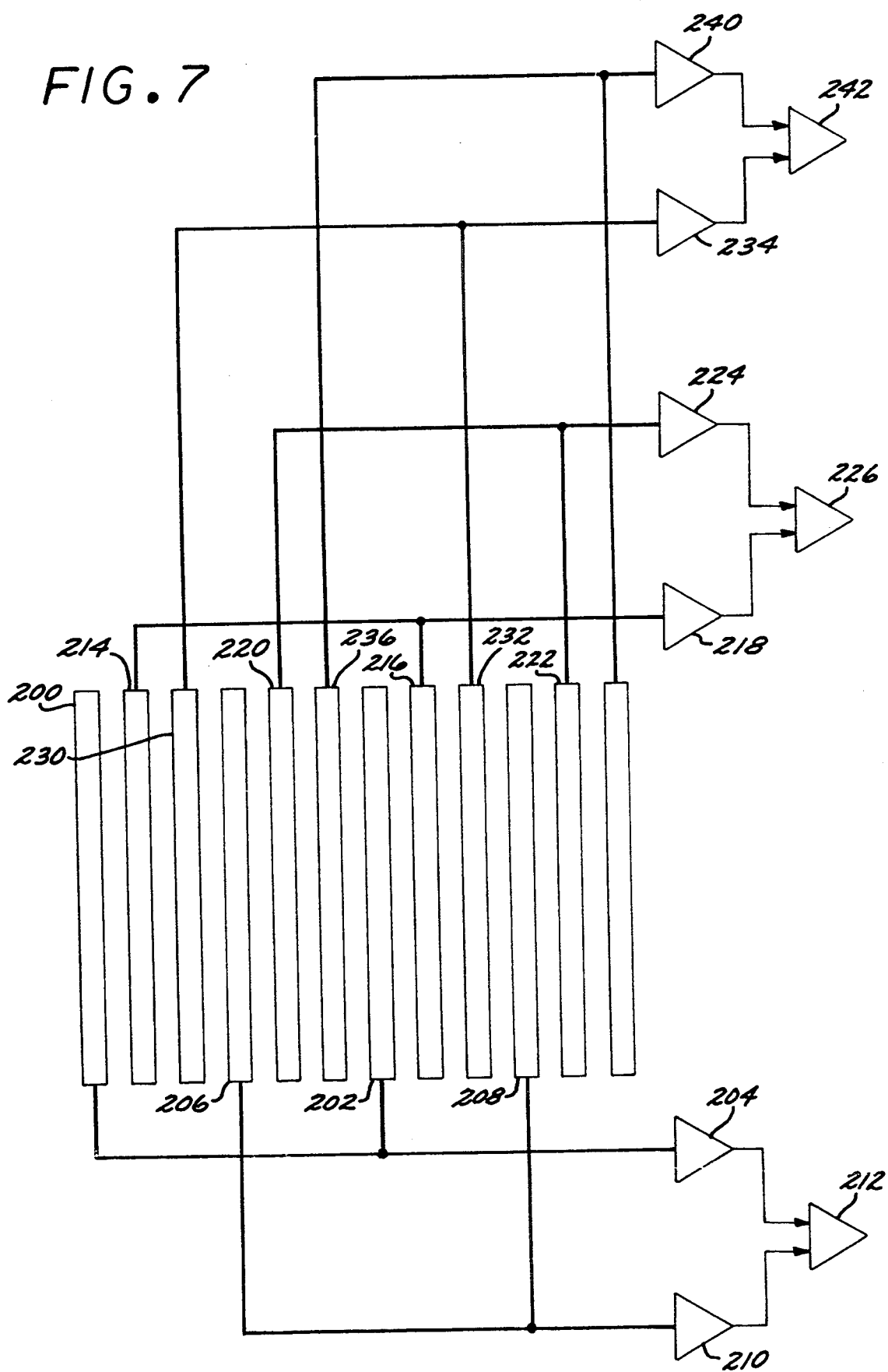
FIG. 7 is a simplified block diagram for reducing capacitive effects by subgrouping conductive strips and using isolation amplifiers.

Referring now to FIG. 7, a circuit arrangement for minimizing the effects of capacitive coupling between conductive (metal) strips is illustrated. Electrical pulses created in a biased conductive strip when contacted by the electron beam may be capacitively coupled into adjacent conductive strips on either side. These false pulses might interfere with the operation of the multiplexer. As described hereinafter, isolation amplifiers are utilized to reject the lower energy pulses created by capacitive coupling, and pass the much higher energy pulses resulting from the electron beam contacting a conductive strip. The circuit arrangement, although described with reference to the conductive strip/phosphor configuration shown in FIGS. 1 and 2, can also be adapted for use with the array configuration shown in FIGS. 4–6.

As illustrated, conductive strips 200 and 202 are connected to isolation amplifier 204 and conductive strips 206 and 208 are connected to isolation amplifier 210. The outputs of isolation amplifiers 204 and 210 are connected to triggering amplifier 212, amplifier 212 corresponding to amplifier 60 shown in FIG. 1 and generating the red trigger signal. In a similar manner, conductive strips 214 and 216 are connected to isolation amplifier 218 and conductive strips 220 and 222 are connected to isolation amplifier 224, the output of isolation amplifiers 218 and 224 being connected to amplifier 226 corresponding to amplifier 60 of FIG. 1 and generating the blue trigger signal. Finally, conductive strips 230 and 232 are connected to isolation amplifier 234 and conductive strips 236 and 238 are connected to isolation amplifier 240, the output of isolation amplifiers 234 and 240 being connected to amplifier 242, amplifier 2 corresponding to amplifier 60 of FIG. 1. In essence, the isolation amplifiers isolate the high frequency capacitive loads of the conductive strips from the other electrical circuit components. The grouping of conductive strips as illustrated also serves to reduce the capacitance between conductive strips.

The present invention thus provides a significant improvement over prior art line indexing CRT devices by providing a system for generating electrical line indexing pulses which enables large screen CRT's to be utilized, and allows the primary color intensities of the image to be simply and inexpensively adjusted by external controls to produce an accurately balanced color picture. The system also provides a technique for compensating for transit propagation delays by slanting the conductive or photovoltie strips, the system also providing a technique for compensating for capacitive effects associated with the conductive strips used to generate the index triggering pulse signals.

While the invention has been described with reference to its preferred embodiment, it will be understood by those skilled in the art that various changes may be made and equivalents may be substituted for elements thereof without departing from the true spirit and scope of the invention. In addition, modifications may be made to adapt a particular situation or material to the teachings of the invention without departing from its essential teachings.

What is claimed is:

1. A system for generating indexing signals for use in a single gun color cathode ray tube, the cathode ray tube having a screen upon which the electron beam emitted by the gun scans across the screen surface comprising:

a screen comprising a sequence of vertical phosphor strips in a predetermined array of strips, each array having three phosphor strips, the first strip emitting illumination corresponding to a first color when scanned by the electron beam, the second phosphor strip emitting illumination corresponding to a second color when scanned by the electron beam and a third strip emitting illumination corresponding to a third color when scanned by the electron beam, a layer of material for generating pulses when scanned by an electron beam overlying each phosphor strip;

means for connecting the pulse generating material in three parallel arrays, the first array comprising all phosphor strips emitting said first color illumination, the second array comprising all phosphor strips emitting said second color illumination and the third array comprising all phosphor strips emitting said third color illumination;

means for connecting each array to a corresponding electrical bus, an electrical pulse being generated by each strip of pulse generating material when scanned by said electron beam;

means for adjusting each pulse generated on each electrical bus; and means for coupling said adjusted electrical pulses from each electrical bus to a multiplexer for connection to the cathode ray tube whereby the electron beam is modulated by externally generated video color signals in synchronism with the particular color phosphor strip being scanned.

2. The system of claim 1 wherein said material for generating pulses comprises conductive metal strips.

3. The system of claim 2 wherein said material comprises aluminum.

4. The system of claim 1 wherein said material for generating pulses comprises photovoltaic material.

5. The system of claim 1 wherein said adjusting means controls the width of each generated pulse whereby the intensity of the illumination emitted by each phosphor strip when scanned by said electron beam is controlled.

6. The system of claim 5 wherein said coupling means comprises means for time delaying the arrival of each pulse at said multiplexer.

7. The system of claim 1 wherein a bias voltage is connected to each electrical bus.

8. The system of claim 1 wherein each phosphor and conductive strip is slanted in the directed of the electron beam scan.

9. The system of claim 1 wherein isolation amplifiers are coupled between each electrical bus and said adjusting means.

10. The system of claim 1 wherein said first color is red, said second color is blue and said third color is green.

11. A system for generating indexing signals for use in a single gun color cathode ray tube, the cathode ray tube having a screen upon which the electron beam emitted by the gun scans across the screen surface comprising:

a screen comprising a sequence of vertical phosphor strips in a predetermined array of strips, each array having three phosphor strips, the first strip emitting illumination corresponding to a first color when scanned by the electron beam, the second phosphor strip emitting light illumination corresponding to a second color when scanned by the electron beam and the third strip emitting illumination corresponding to a third color when scanned by the electron beam, a layer of material for generating pulses when scanned by an electron beam being interposed between each array;

means for connecting the pulse generating material in three parallel arrays, the first array comprising all phosphor strips emitting said first color illumination, the second array comprising all phosphor strips emitting said second color illumination and the third array comprising all phosphor strips emitting said third color illumination;

means for connecting each array to an electrical bus, an electrical pulse being generated by each strip of pulse generating material when scanned by said electronic beam;

means for adjusting the width of and delaying each pulse generated on said electrical bus in a predetermined sequence, adjusting the width of the pulses controlling the intensity of the illumination emitted by the phosphor strip when scanned by said electron beam; and means for coupling said width adjusted and delayed electrical pulses to a multiplexer for connection to the cathode ray tube whereby the electron beam is modulated by externally generated video color signals in synchronism with the particular color phosphor strip being scanned.

12. The system of claim 11 wherein said material for generating pulses comprises conductive metal strips.

13. The system of claim 12 wherein said material comprises aluminum.

14. The system of claim 11 wherein said material for generating pulses comprises photovoltaic material.

15. The system of claim 11 wherein a bias voltage is connected to each electrical bus.

16. The system of claim 11 wherein each phosphor strip is slanted in the direction of the electron beam scan.

17. The system of claim 11 wherein isolation amplifiers are coupled between each electrical bus and said adjusting and delaying means.

18. The system of claim 11 wherein said first color is red, said second color is blue and said third color is green.

* * * * *